Figure 1:
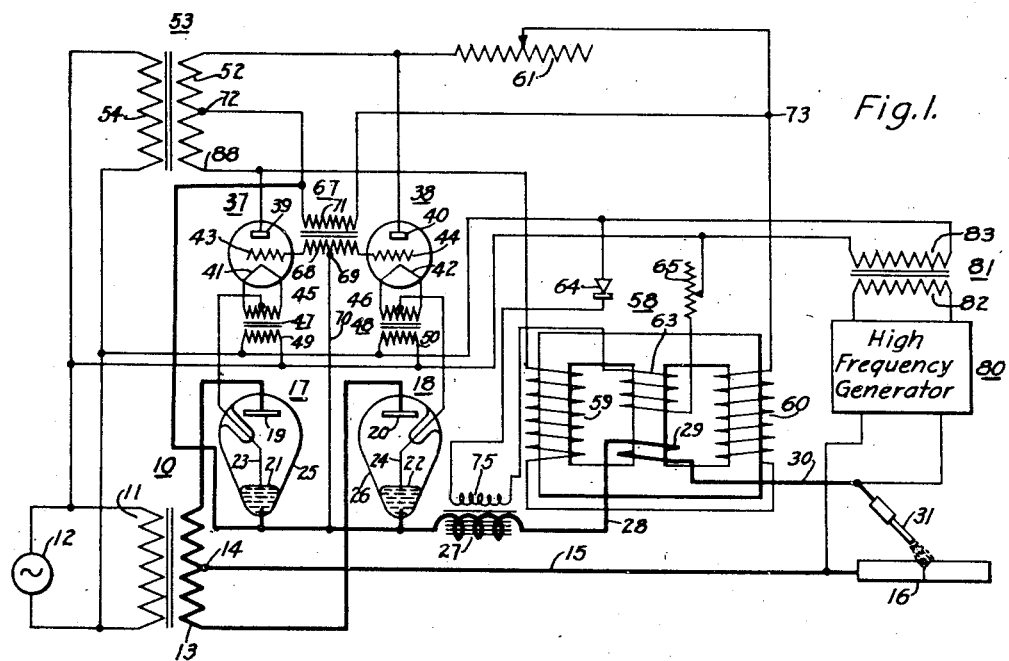

March 19, 1935.  J. W. DAWSON  1,994,907
ARC WELDING APPARATUS
Filed Sept. 6, 1933

INVENTOR
John W. Dawson
ATTORNEY

Patented Mar. 19, 1935

1,994,907

UNITED STATES PATENT OFFICE 1,994,907

ARC WELDING APPARATUS

John W. Dawson, Wilkinsburg, Pa., assignor to Westinghouse Electric & Manufacturing Company, East Pittsburgh, Pa., a corporation of Pennsylvania Application September 6, 1933, Serial No. 688,318

10 Claims. (Cl. 219—8)

My invention relates generally to electric welding and it has particular relation to arc welding.

In many instances, it is desirable to utilize direct current for performing arc welding operations. Often, however, direct current is not available at all or is not available in such quantities as to adequately provide for performing arc welding operations which may require currents in the order of several hundred amperes. Direct current is not usually available because of the fact that ordinarily only alternating current sources are commercially available since this kind of current is generally more economical for commercial use than is direct current.

In the past, in order to obtain direct current, it has generally been customary to provide a separate direct current generator which has been driven by either an alternating current motor connected to an alternating current source or by means of a gasoline engine. An independent generator of this type is generally desirable in view of the fact that the characteristics of a welding load are highly variable and, therefore, would affect other loads in parallel therewith unless a separate generator were provided which is individual to the arc welding circuit. Such generating systems, however, are expensive, since they require two units, that is, a motor or engine and a generator. Not only are such units expensive in first cost but also they are expensive to maintain and operate.

In certain instances where the polarity of the welding circuit was not important, alternating current has been utilized for performing arc welding operations. Alternating current may be used satisfactorily where the amperage is relatively large, so that the arc will be maintained despite the alternations of the current. For low current values when alternating current is utilized, it has been proposed to provide a high-frequency generator for maintaining the arc path in the ionized state continually so that the arc may be again ignited or struck after each successive half cycle.

It is desirable to provide a relatively inexpensive means for obtaining direct current for use in arc welding from an alternating current source. It has been proposed to provide for rectifying the alternating current as supplied by a transformer for performing the welding operation. However, as far as I am aware, no means has been provided in the prior art for controlling the rectifying means in accordance with the flow of welding current so that a predetermined average arc voltage may be maintained. The systems in the prior art have provided for supplying the rectified alternating current through a current limiting resistor or reactor, or both, in order to obtain the necessary current-voltage characteristics for properly maintaining the welding arc. Current flow through such a device, of course, causes a considerable power loss which lowers the overall efficiency of the welding system through the expenditure of power in the current limiting device which serves no useful purpose.

In view of the foregoing, therefore, it is an object of my invention to provide an arc welding system which shall be simple and efficient in operation and which may be readily and economically manufactured and installed.

The principal object of my invention is to provide for rectifying alternating current so that the direct current thus obtained may be utilized in carrying out arc welding operations.

Another important object of my invention is to provide for controlling the rectifying action of a rectifier used for supplying direct current to a welding circuit in accordance with the flow of welding current.

Another object of my invention is to provide for adjusting the average arc voltage which may be obtained from a rectifier used in supplying direct current to a welding circuit.

A still further object of my invention is to provide for rendering a rectifier conducting at predetermined instants in the current or voltage waves of alternating current, in order to vary the average voltage which is supplied for maintaining a welding arc.

Other objects of my invention will in part be obvious and in part appear hereinafter.

My invention, accordingly, is disclosed in the embodiment hereof shown in the accompanying drawing and comprises the features of construction, combination of elements and arrangement of parts which will be exemplified in the construction hereinafter set forth and the scope of the application of which will be indicated in the appended claims.

Figure 2:
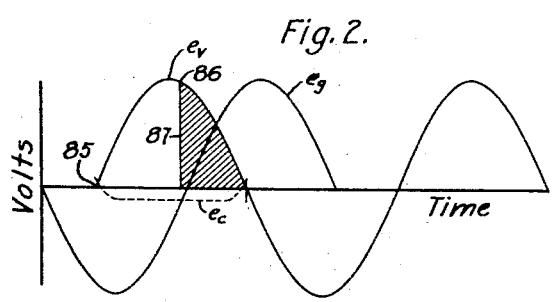
Figure 3:
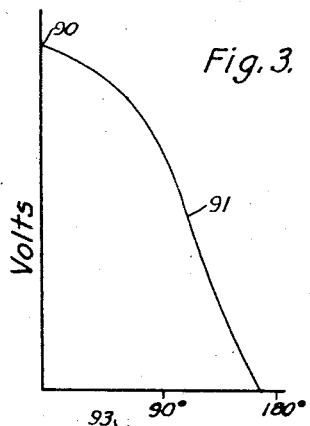
Figure 4:
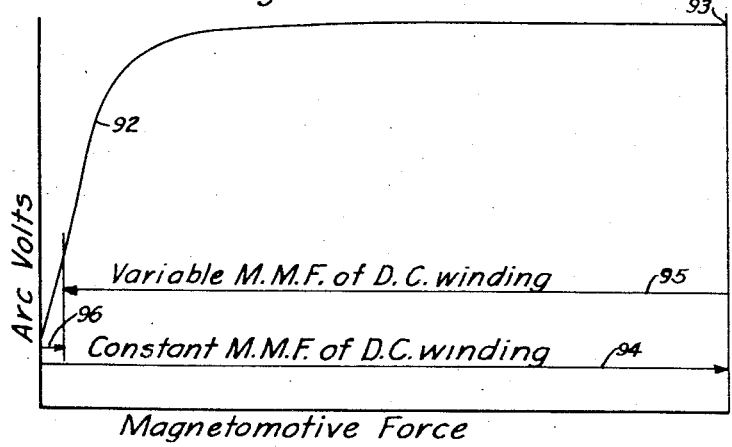

For a more complete understanding of the nature and scope of my invention, reference may be had to the following detailed description taken in connection with the accompanying drawing, in which Figure 1 diagrammatically represents the circuit connections which may be used in practicing my invention; and Figs. 2, 3 and 4 show a number of curves which demonstrate the operating characteristics of a welding system organized in accordance with my invention.

In general, according to my invention, I provide a pair of vapor electric or rectifying devices which are connected to rectify full waves of alternating current and to supply the direct current thus obtained to a welding circuit. A control tube is provided, individual to each of the vapor electric devices, for igniting it to render it conducting for the corresponding half cycle of current during which it is adapted to be conducting.

Since the control tubes may be so arranged as to render the vapor electric devices conducting, at any desired instant in the current or voltage wave, it is possible to vary the average voltage which is supplied for performing the arc welding operation by varying the instant at which the vapor electric devices are rendered conducting. The control tubes that may be used are of the space discharge type which may be provided with the well known grid type of control. The ionizing potential which is applied to the grids controls their operation. Therefore, whenever the ionizing potential is applied to the grids, the vapor electric devices are correspondingly rendered conducting.

The welding circuit is provided with a saturable reactor which is interposed by interconnection between the welding circuit and the grids in such manner as to vary the instant at which the ionizing potential is applied in accordance with the flow of current in the welding circuit. Therefore, it is possible to vary the average arc voltage which is applied for performing the welding operation, in accordance with the current flow in the welding circuit, so that a predetermined relation between the arc current and voltage may be maintained.

Referring now particularly to Fig. 1 of the drawing, it will be observed that a concrete embodiment of the invention is there illustrated. The reference character 10 designates generally a transformer having a primary winding 11 which may be connected to any suitable source 12 of alternating current and a secondary winding 13 which ordinarily is of large current capacity to supply the welding current. It will be observed that the secondary winding 13 is provided with a center tap 14 which may be connected by means of a conductor 15 to work 16 on which a welding operation is to be performed.

In order to change the alternating current supplied by the transformer 10 into direct current for performing the arc welding operation, a pair of vapor electric or rectifying devices, shown generally at 17 and 18 is provided. Each of the vapor electric devices 17 and 18 is respectively provided with anodes 19 and 20 and mercury pools 21 and 22, together with igniter electrodes 23 and 24, dipping into the mercury pools, all contained in a suitable vessel or container 25 and 26 of glass or other suitable material.

The vapor electric devices 17 and 18 are of the type which are rendered conducting by passing current through the igniter electrodes 23 and 24 for each half cycle during which they are arranged to be conducting. Thus, as long as no current flows through either of the igniter electrodes 23 and 24, neither of the vapor electric devices 17 or 18 will be conducting. However, as soon as a suitable current is caused to flow through the igniter electrodes 23 and 24, the vapor electric devices 17 and 18 will be rendered conducting at the instant that such current flows for a time which is at least as long as that required for the remainder of the half cycle, corresponding to which the vapor electric device 17 or 18 is conducting, to be passed. If the current flowing through the igniter electrodes 23 and 24 is immediately cut off, then the vapor electric devices 17 and 18 will remain in the conducting condition only to the end of the corresponding half cycle for which they are adapted to be conducting.

It will be observed that the cathodes 19 and 20 are connected to the opposite terminals of the secondary winding 13. It will be readily understood that the vapor electric devices 17 and 18 are unidirectional current conducting devices so that, by means of this connection, it is possible to rectify successive half waves or a full wave of alternating current. The mercury pool cathodes 21 and 22 are connected together, and may be connected through a suitable inductor 27, conductor 28, differential winding 29 and conductor 30 to a welding electrode 31 which is disposed in arcing relation to the work 16.

The arrangement and functioning of the differential winding 29 will be set forth in detail hereinafter, it being mentioned at this time merely to complete the description of the circuit extending between the transformer 10, the work 16 and electrode 31.

With a view to supplying current to the igniter electrodes 23 and 24 at the proper instants in the current or voltage wave of alternating current space discharge or control tubes, shown generally at 37 and 38, are provided, each being individual to the vapor electric devices 17 and 18, respectively. Each of the control tubes 37 and 38 is provided, respectively, with anodes 39 and 40, cathodes 41 and 42 and grids 43 and 44.

As illustrated in the drawing, the cathodes or filaments 41 and 42 of the control tubes 37 and 38 are connected from the mid-points of the secondary windings 45 and 46 of the filament transformers 47 and 48 to the igniter electrodes 23 and 24, respectively. The primary windings 49 and 50 of the filament transformers 47 and 48, respectively, are connected over obvious circuits to the source 12 of alternating current.

The anodes 39 and 40 of the control tubes 37 and 38 are connected to the terminals of a secondary winding 52 of an auxiliary transformer, shown generally at 53, having a primary winding 54 which may be connected to the source 12 of alternating current. It will be understood that, when the grids 43 and 44 have applied thereto an ionizing potential in the usual manner, the control tubes 37 and 38 will become conducting at that instant provided the proper polarity is applied to the corresponding anodes 39 and 40 and, as a result, that current will flow through the igniter electrodes 23 and 24 at corresponding times to render the vapor electric devices 17 and 18 conducting.

As set forth hereinbefore, it is desirable to control the instant at which the vapor electric devices 17 and 18 are rendered conducting and for that purpose, an automatic phase shifting circuit is provided which comprises a saturable reactor 58 which is commonly known as a three-legged reactor. As illustrated in the drawing, the reactor 58 is provided with two alternating current windings 59 and 60 which are disposed on the outside legs of the reactor 58 and connected in series circuit relation to the secondary winding 52 of the auxiliary transformer 53 through an adjustable resistor 61.

The middle leg of the reactor 58 is provided with a constantly excited or biasing winding 63 which may be connected through a rectifier 64 and an adjustable resistor 65 to a source of alternating current such as the source 12. The rectifier 64 may be of the copper oxide type and may either be a full or a half wave rectifier. The biasing winding 63 is disposed as illustrated in order to provide a predetermined degree of saturation in the reactor 58 for a purpose which will be set forth hereinafter.

With a view to controlling the application of ionizing potential to the grids 43 and 44, a grid transformer, shown generally at 67, is provided having a secondary winding 68 connected to the grids 43 and 44, as illustrated, with the midpoint 69 connected by means of conductor 70 to the common connection between the cathodes 21 and 22 of the vapor electric devices 17 and 18. The grid transformer 67 is also provided with a primary winding 71 which may be connected between a mid-point 72 on the secondary winding 52 of the auxiliary transformer 53 and to a point 73 which is located in the common connection between the alternating current winding 60 and the resistor 61.

As illustrated in the drawing, the winding 29, which is connected in the welding circuit between conductors 28 and 30 is disposed on the middle leg of the reactor 58 and it is so disposed that the flux generated thereby, in the middle leg, flows in such a direction as to oppose the flux which is generated by the biasing winding 63. In other words the winding 29 is disposed differentially or subtractively with respect to the biasing winding 63.

It will be observed that the inductor 27 has inductively associated therewith a secondary winding 75 which is connected in series circuit relation with the biasing winding 63. The secondary winding 75 is provided in order to introduce a voltage in the circuit including the biasing winding 63 on change of welding current which will approximately be equal to and oppose the voltage which is induced in the biasing winding 63 by the winding 29 when such current change occurs. It will be understood that, if the secondary winding 75 were not provided and connected as shown and described, the induced voltages resulting from the transient changes in the welding circuit, as reflected in the biasing winding 63, might be such as to overcome the desired biasing effect of this winding and thus introduce other variables in the control circuits for the grids 43 and 44 which would not be desirable.

In order to further stabilize the operation of the arc which is maintained between the work 16 and the welding electrode 31, a high-frequency generator, shown generally at 80, may be provided which may be energized from a suitable transformer, shown generally at 81, having a secondary winding 82 connected to the generator 80 and a primary winding 83 which may be connected to any suitable source of alternating current, such as the source 12. The high-frequency generator 80 may be connected to the welding circuit in any suitable manner, such as the connections illustrated in the drawing which show it as being connected directly across the welding arc. Since the construction of the high-frequency generator 80 forms no part of this invention and further since the construction thereof is well known to those skilled in the art, a detailed description thereof will not be set forth in this specification.

In order to more clearly understand the operation of the welding system illustrated in Figure 1 of the drawing, reference may be had to the curves shown in Figs. 2, 3 and 4, whereby the characteristics of operation of the circuit are shown.

In Fig. 2, it will be observed that the curve "$e_v$" is plotted having time as the abscissa, and volts as the ordinates, and representing the alternating current wave which is applied by means of the transformer 10. It will be understood that either the voltage or current wave may be employed to demonstrate the functioning of my invention. It will also be understood that the current and voltage waves may coincide or the current wave may be shifted in phase with respect to the voltage wave depending upon the constants of the circuit. For purposes of clarity in illustration, however, only the voltage wave is illustrated.

The curve "$e_c$" represents the critical voltage which, if exceeded in a positive sense, as by the application of ionizing potential to the grids 43 and 44, will cause the control tubes 37 and 38 to become conducting. It will be understood that the critical voltage "$e_c$" may be represented by a curve above the axis for one of the control tubes 37 and 38, since they are connected to be conducting on successive half cycles of the alternating current.

Th curve "$e_g$" represents the ionizing potential which is applied to the grids 43 and 44 for rendering the control tubes 37 and 38 conducting and thereby causing current to flow through the igniter electrodes 23 and 24 to render the vapor electric devices 17 and 18 conducting.

It will be observed that the position of the curve "$e_g$" is shifted considerably in phase behind the position of the curve "$e_v$". Thus instead of the vapor electric device 17, for instance, becoming conducting at the zero point in the voltage wave "$e_v$", as at 85, it becomes conducting at a time such as indicated at 86 so that it is conducting over a period which may be represented by the shaded portion between the ordinate 87 and the curve "$e_v$". It will be understood that the critical voltage as represented by the curve "$e_c$" has been exceeded by the application of ionizing potential as represented by the curve "$e_g$" at the time indicated at 86 so that the corresponding control tube 37, for instance, will be rendered conducting.

Assuming that the welding electrode 31 is out of arcing engagement with the work 16, so that no current flows in the welding circuit, then maximum saturation will be effective as applied by the biasing winding 63, so that the reactor 58 will be saturated. As a result, the impedance of the alternating current winding 59 and 60 is relatively low and the point 73, representing one terminal of the primary winding 71 of the grid transformer 67 will be substantially at the same potential as the terminal 88 of the secondary winding 52 of the auxiliary transformer 53. Under these conditions, the curve "$e_g$" will then substantially coincide with the curve "$e_v$" so that the vapor electric devices 17 and 18 will be rendered conducting at the beginning of the corresponding current or voltage waves.

Since the vapor electric devices 17 and 18 are rendered conducting at the zero points of the wave "$e_v$", the maximum direct current voltage will be applied to the welding circuit, under this condition, as is represented by the point 90 on the curve 91 of Fig. 3, showing the relation between the voltage which is applied to the welding circuit and the angular phase shift of the grid voltage curve "$e_g$" with respect to the voltage curve "$e_v$".

This condition is also illustrated by the curve 92 in Fig. 4 at the point 93 which represents the voltage applied to the welding circuit when only the magnetomotive force, as represented by the abscissa 94, is applied by the biasing winding 63.

As is well understood, it is desirable to provide a drooping voltage characteristic for the welding circuit, and, therefore, it is desirable to shift the phase relation of the voltage applied to the grids 43 and 44, so that the vapor electric devices 17 and 18 will be rendered conducting for only a portion of the current or voltage wave and, as a result, applying a correspondingly lower average voltage to the welding circuit. It is for this purpose that the winding 29 is provided on the middle leg of the reactor 58 in differential or subtractive relation with respect to the biasing winding 63. As soon as current flows in the welding circuit, such as is the case when the welding electrode 31 is brought into arcing engagement with the work 16, a counter or variable magnetomotive force is generated by the differential winding 29 in opposition to the magnetomotive force generated by the biasing winding 63. This variable magnetomotive force may be represented by the abscissa 95, Fig. 4, and as a result a magnetomotive force, which may be represented by the abscissa 96, is all that is available for saturating the core of the reactor 58.

Due to the fact that the core of the reactor 58 is no longer saturated, the impedance of the alternating current windings 59 and 60 correspondingly increases so that the point 73 or terminal of the primary winding 71 of the grid transformer 67 is no longer maintained at the same potential as the point 88. The result is that the ionizing potential is applied to the grids 43 and 44 at some later time depending upon the degree of effect which the counter or variable magnetomotive force, as generated by the winding 29, has on the magnetomotive force generated by the biasing winding 63.

By properly adjusting the values of the resistors 61 and 65, it is possible to obtain the desired welding current and voltage relations which are most suitable for the particular work to be welded. These adjustments will depend upon the characteristics of the circuits and the type of work being welded and, therefore, it is a matter of experiment to determine what adjustments are best suited for performing different welding operations.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. An arc welding system comprising, in combination, rectifying means connected to supply direct current to a welding circuit from an alternating current source, control means connected to render said rectifying means conducting, and means including a saturable reactor interposed between the welding circuit and said control means for rendering said rectifying means conducting at predetermined instants on the voltage or current waves depending on the current flow in the welding circuit.

2. An arc welding system comprising, in combination, rectifying means connected to supply direct current to a welding circuit from an alternating current source, control means connected to render said rectifying means conducting, a saturable reactor connected to said control means, a constant exciting winding on said reactor connected to a direct current source and effective to render said rectifying means conducting at a relatively early point on the current or voltage waves of alternating current, and a variable exciting winding subtractively disposed on said reactor relative to said constant exciting winding and connected in series circuit relation with the welding circuit for varying the saturation of said reactor to regulate the instants on the voltage or current waves at which said rectifying means is rendered conducting.

3. An arc welding system comprising, in combination, rectifying means connected to supply direct current to a welding circuit from an alternating current source, control means connected to render said rectifying means conducting, a saturable reactor connected to said control means, a constant exciting winding on said reactor connected to a direct current source and effective to render said rectifying means conducting at a relatively early point on the current or voltage waves of alternating current, a variable exciting winding subtractively disposed on said reactor relative to said constant exciting winding and connected in series circuit relation with the welding circuit for varying the saturation of said reactor to regulate the instants on the voltage or current waves at which said rectifying means is rendered conducting, and a winding connected in series circuit relation with said constant exciting winding and disposed in inductive relation to the welding circuit to introduce into the circuit including the constant exciting winding on change of welding current a voltage approximately equal and opposed to the voltage induced in the constant exciting winding by said variable exciting winding on change of welding current.

4. An arc welding system comprising, in combination, a pair of rectifiers connected to supply direct current to a welding circuit from an alternating current source, control means individual to each of the rectifiers for rendering them conducting at predetermined points on the corresponding voltage or current waves, and means comprising a saturable reactor interposed between the welding circuit and said control means for controlling the operation of said rectifiers in accordance with the flow of welding current.

5. An arc welding system comprising, in combination, a pair of rectifiers connected to supply direct current to a welding circuit from an alternating current source, a space discharge tube individual to each of the rectifiers for rendering them conducting during succeeding half cycles of the alternating current, a grid in each control tube, and automatic phase shifting means interposed between said grids and the welding circuit for effecting the application of ionizing potential to said grids at times in accordance with the flow of welding current thereby regulating the instants in the current or voltage waves at which said rectifiers are rendered conducting in accordance with said current flow.

6. An arc welding system comprising, in combination, a pair of rectifiers connected to supply direct current to a welding circuit from an alternating current source, a space discharge tube individual to each of the rectifiers for rendering them conducting for succeeding half cycles of the alternating current, a grid in each control tube, control means for applying ionizing potential to said grids at a relatively early point in the current or voltage waves of the alternating current to render said rectifiers conducting at the respective instants when no current is flowing in the welding circuit, and additional control means connected to be responsive to the current flow in the welding circuit for shifting the instant at which said ionizing potential is applied in accordance with said current flow.

7. An arc welding system comprising, in combination, a pair of rectifiers connected to supply direct current to a welding circuit from an alternating current source, a space discharge tube individual to each of the rectifiers for rendering them conducting for succeeding half cycles of the alternating current, a grid in each control tube, a saturable reactor connected to said grids, a biasing winding on said reactor connected to a direct current source for effecting the application of ionizing potential to said grids at a predetermined instant in the current or voltage wave of the alternating current to thereby render said rectifiers conducting at that instant, and a differential winding subtractively disposed on said reactor with respect to said biasing winding and connected in series circuit relation with the welding circuit for regulating the time at which said rectifiers are rendered conducting in accordance with the flow of welding current.

8. An arc welding system comprising, in combination, a welding transformer provided with a primary winding for connection to a source of alternating current and a secondary winding having a center tap connected to work on which a welding operation is to be performed, a pair of vapor electric devices each having an anode connected to the terminals of the secondary winding and a cathode, said cathodes being connected together and to a welding electrode disposed in arcing relation to said work, a control tube individual to each of the vapor electric devices for rendering them conducting on successive half cycles of the welding current, a grid in each control tube, and an automatic phase shifting circuit for controlling the application of ionizing potential to said grids to regulate the time during which said vapor electric devices are rendered conducting comprising an auxiliary transformer having a primary winding connected to said source of alternating current and a secondary winding having a center tap, a grid transformer having a secondary winding connected to said grids and a primary winding one terminal of which is connected to said center tap on the secondary winding of the auxiliary transformer, a saturable reactor having an alternating current winding connected to the terminals of the secondary winding of the auxiliary winding through a resistor, the remaining terminal of the primary winding of the grid transformer being connected to the common connection between said resistor and said alternating current winding, a first saturating winding on said reactor connected to a direct current source and a second saturating winding subtractively disposed on said reactor with respect to said first saturating winding and connected in series circuit relation with the welding circuit.

9. An arc welding system comprising, in combination, a pair of rectifiers connected to supply direct current to a welding circuit from an alternating current source, space discharge means individual to each of the rectifiers for rendering them conducting during succeeding half cycles of the alternating current, and automatic phase shifting means connected to be responsive to the flow of current in the welding circuit for rendering said space discharge means conducting at times in accordance with the flow of welding current thereby controlling the instants in the current or voltage waves of the alternating current at which said rectifiers are rendered conducting.

10. An arc welding system comprising, in combination, a pair of rectifiers connected to supply direct current to a welding circuit from an alternating current source, a space discharge device individual to each of the rectifiers for rendering them conducting for succeeding half cycles of the alternating current, control means connected to render said space discharge devices conducting at a relatively early instant in the current or voltage waves of the alternating current to render said rectifiers conducting at the respective instants when no current is flowing in the welding circuit, and additional control means connected to be responsive to the current flow in the welding circuit for shifting the instants at which said space discharge devices are rendered conducting to correspondingly shift the instants when said rectifiers are rendered conducting.

JOHN W. DAWSON.